United States Patent
Strauss et al.

[11] 3,730,075
[45] May 1, 1973

[54] PERCOLATOR

[76] Inventors: Bruce Paul Strauss, 624 62nd Street; Michael Andrew Otavka, 8016 Highland Avenue, both of Downers Grove, Ill. 60515

[22] Filed: Feb. 19, 1971

[21] Appl. No.: 116,919

[52] U.S. Cl. ................................................99/310
[51] Int. Cl. ..............................................A47j 31/00
[58] Field of Search...................99/310, 311, 312, 99/313, 314

[56] References Cited
UNITED STATES PATENTS 2,660,107  11/1953  Cappello ................................99/312
1,895,857  1/1933  Mockbee................................99/310
3,208,370  9/1965  Steriss....................................99/312

Primary Examiner—Robert W. Jenkins
Attorney—Joel F. Spivak

[57] ABSTRACT

An improved coffee percolator comprising a container, a perforated coffee basket seated on a hollow stem within said container, the improvement comprising a condensation plate on said stem below and spaced from the bottom of said basket.

2 Claims, 3 Drawing Figures

Patented May 1, 1973 3,730,075

INVENTORS
BRUCE P. STRAUSS &
MICHAEL A. OTAVKA

PERCOLATOR

BACKGROUND OF THE INVENTION

This invention relates to improved coffee percolators.

A common problem encountered with coffee percolators is that after the coffee has been perked to the desired strength, the coffee continues to get even stronger with time while attempting to keep it hot for serving. Eventually, the coffee becomes too strong for the pallate. This phenomenon occurs because water vapor continues to evaporate from the coffee even though it is not heated to a boil, and this water vapor condenses in the coffee basket reflowing through the grinds back into the coffee. It is desirable to minimize this effect if possible.

An object of this invention is to provide means for minimizing reflux of water through the coffee grinds while keeping the coffee hot for serving or during reheating.

SUMMARY OF THE INVENTION

A coffee percolator, comprising a container and a perforated coffee grind basket supported on a hollow stem tube which extends from a support at the bottom portion of the container through the coffee basket, said percolator including vapor condensing means supported on said stem below said coffee basket.

DETAILED DESCRIPTION OF THE PREFERRED EMBODIMENTS

Figure 1:
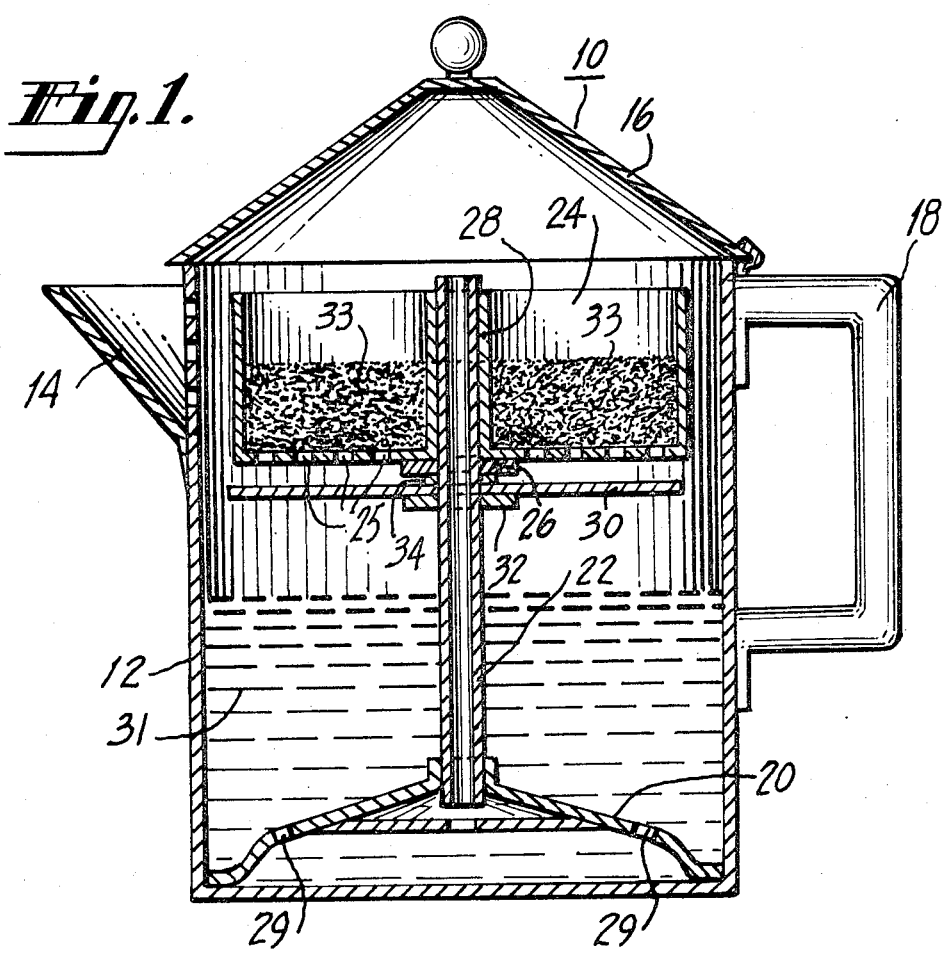
FIG. 1 is a sectional view of a coffee percolator including a vapor condensing baffle according to the invention.

Referring to FIG. 1 there is shown a coffee percolator 10 consisting of a container 12 having a pouring spout 14, a cover 16 and a handle 18. Within the container 12 is a partition plate 20 shown in the form of an inverted champagne glass and resting on the bottom of the container 12. The partition plate 20 is provided with a hollow stem member 22 which extends upwardly through a coffee grind basket 24 having perforations 25 on the bottom thereof. The coffee grind basket 24 is supported on the stem 22 by first annular flange 26 formed on the stem 22. For added support, the basket 24 is proved with a hollow axial tube 28 at the center thereof which telescopes over the stem 22.

The partition plate 20 is provided with a plurality of openings 29 to permit passage of liquid 31 in the percolator 10 to pass from the outside of the plate 20 into the cup-like portion of the plate 20 and then up the stem 22 and into the grind basket 24 where it refluxes through coffee grinds 33 contained therein and back into the remainder of liquid 31 in the container 12.

The feature of the novel coffee percolator is a condensation baffle plate 30 which is supported on the stem 22, close to but spaced from and below the bottom of the basket 24. The baffle plate 30 as shown is a unitary, rigid body which is supported on the the stem 22 by means of a hole in the center of the baffle plate 20 through which the stem fits. The stem is provided with a second annular flange 32 on which the baffle plate 30 rests. For increased support, the perifery of the hole in the baffle plate is provided with a flange 34 which telescopes the stem in the manner shown.

The baffle plate 30, may of course be supported on the stem by other means, such as welding, threading it on or the like. While the baffle plate is preferably made from a metal such as aluminum or stainless steel other materials are also useful. For example, it may be made of plastics, ceramics or metal clad plastics or ceramics. The only requirement is that the material be resistant to the heat, and the other materials present in the percolator.

The baffle plate 30 preferably should have as large a surface area as possible. In addition, the plate is preferably at least the same diameter as the bottom of the basket but should be smaller than the diameter of the container, unless the plate is perforated, so that while the coffee is being perked, the liquid can flow back toward the bottom of the container.

Figure 2:
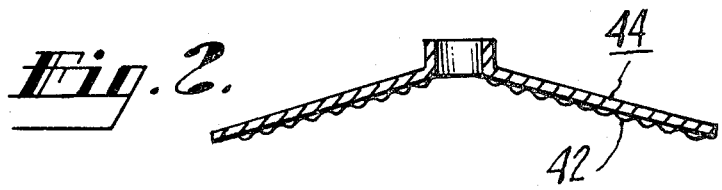
FIGS. 2 and 3 are side elevational views of preferred condensation baffles useful in the novel coffee percolator.
Figure 3:
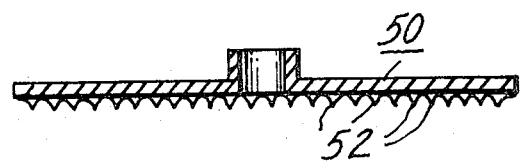

Preferred configurations of the baffle plate are shown in FIGS. 2 and 3. In the embodiment shown in FIG. 2 a surface 42 of the baffle plate 44 is corrugated in shape so as to increase the surface area thereof. In the embodiment shown in FIG. 3 the surface area is increased by providing the baffle 50 with a plurality of teat-like protrusions 52.

In operations of the novel percolator, during perking water which becomes the liquid coffee is passed up through the hollow stem to the top of the coffee basket and refluxes through the coffee grinds back to the liquid reservoir. This is the normal operation of percolators. During the time when further perking is no longer desired, and the heat is reduced simply to keep the liquid coffee hot, water vapor constantly forms and then condenses. In the prior art percolators a significant amount of this condensation occurred at the coffee basket and the condensate refluxed through the grinds strengthening the coffee. In the novel percolator the amount of vapor reaching the basket is substantially reduced by the condensation baffle plate provided below the basket where most of the vapor condenses.

What I claim is:

1. In a coffee percolator comprising a container for coffee, a coffee grind basket within said container, a hollow tube extending from a support upward from the bottom portion of said container and through said coffee grind basket, the improvement comprising a baffle plate vapor condensing means spaced from and below said coffee grind basket, said baffle comprising a unitary, rigid member the periphery of which is spaced from the walls of said container and a lower surface of which is corrugated.

2. In a coffee percolator comprising a container for coffee, a coffee grind basket within said container, a hollow tube extending from a support upward from the bottom portion of said container and through said coffee grind basket, the improvement comprising a baffle plate vapor condensing means spaced from and below said coffee grind basket, said baffle comprising a unitary, rigid member the periphery of which is spaced from the walls of said container and the lower surface of which is provided with teat like protrusions.

* * * * *